United States Patent [19]

Habermeier et al.

[11] B 3,994,865

[45] Nov. 30, 1976

[54] FLAME-RESISTANT FIBERS OF LINEAR, THERMOPLASTIC POLYESTERS

[75] Inventors: Juergen Habermeier, Pfeffingen; Hans Batzer, Arlesheim, both of Switzerland

[73] Assignee: Ciba-Geigy Corporation, Ardsley, N.Y.

[22] Filed: Nov. 5, 1974

[21] Appl. No.: 521,125

[44] Published under the second Trial Voluntary Protest Program on February 10, 1976 as document No. B 521,125.

[30] Foreign Application Priority Data
Nov. 13, 1973 Switzerland.................... 15957/73

[52] U.S. Cl............................ 260/75 N; 260/75 H; 260/DIG. 24

[51] Int. Cl.$^2$......................................... C08G 63/68
[58] Field of Search.......... 260/75 N, 75 H, DIG. 24

[56] References Cited
UNITED STATES PATENTS 3,860,564  1/1975  Habermeier et al............. 260/75 N

*Primary Examiner*—Howard E. Schain
*Assistant Examiner*—W. C. Danison, Jr.
*Attorney, Agent, or Firm*—Luther A. R. Hall

[57] ABSTRACT

Linear, thermoplastic polyesters based on terephthalic acid, ethylene glycol or 1,4-butanediol, which contain co-condensed chlorinated and/or brominated 1,3-bis-(hydroxyalkyl)-benzimidazolones, crystallize on stretching and are suitable for the manufacture of flame-resistant to flameproof fibers.

12 Claims, 1 Drawing Figure

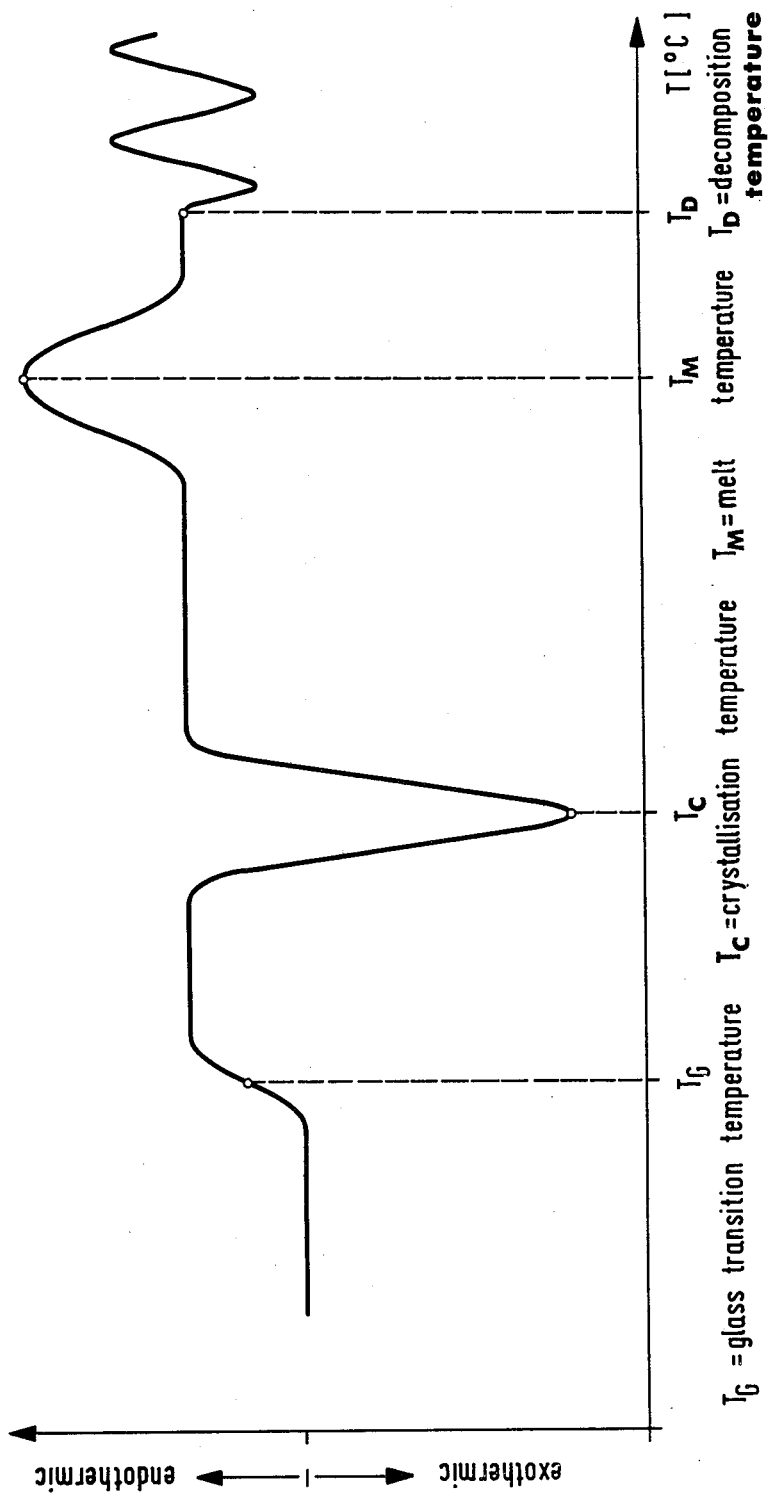

FLAME-RESISTANT FIBERS OF LINEAR, THERMOPLASTIC POLYESTERS

The present invention relates to the use of linear, thermoplastic polyesters based on terephthalic acid and ethylene glycol or 1,4-butanediol, which contain co-condensed bis-(hydroxyalkyl)-benzimidazolones which are completely chlorinated and/or brominated in the phenyl nucleus, for the manufacture of flame-resistant fibres.

The use of poly(alkylene terephthalate), especially poly(ethylene terephthalate), for the manufacture of fibres has been known for a considerable time. However, these fibres are readily inflammable and burn very well. For reasons of safety, and in order to extend their field of use, it is therefore desirable to provide the fibres of these polyesters with a flame-resistant finish without, however, thereby lowering their good mechanical properties It has been proposed to add organic compounds containing chlorine or bromine, optionally together with antimony trioxide, to the polyester melts before spinning, in order to obtain a flame-resistant finish. However, this has the disadvantage that these additives have a pigmenting action and lower the mechanical properties of the fibres. It has proved desirable to incorporate suitable polyester-forming halogenated monomers into the chain of the polyester, since the adverse influence of the flame-resistant component on the mechanical properties can in this way largely be repressed. A disadvantage of this method is that polyesters which are unsuitable for the manufacture of fibres may be obtained, since the polyesters are then amorphous and are only able to crystallise to a limited extent.

It is known, for example, from "Chemical Engineering News, May 1973, page 27" to co-condense 2,5-dibromoterephthalate acid as a co-component in the polyesters, whilst published Japanese Patent Application No. 73/07,872 describes the use of 2,5-dichloro-para-xylylene glycol as a co-component. However, these compounds only contain two halogen atoms in the molecule and hence relatively high proportions must be incorporated into the polyester to achieve flame-resistant finishes.

It is also known to add tetrabromo-bisphenol A as a co-component for the manufacture of flame-resistant polycarbonates. This compound is of low reactivity and unsuitable for polycondensation for the manufacture of polyesters. This difficulty can also not be circumvented by employing the bis-hydroxyalkylated derivative. It has been found that this compound decomposes during the polycondensation, resulting in severe discolouration of the polycondensate.

It is the object of the present invention to discover a polyester which contains, as the flame-resistant component, a more highly halogenated monomer, whilst at the same time the crystallisation of the polyester, required for fibre formation, remains preserved.

It has now been found that flame-resistant polyesters suitable for the manufacture of fibres are obtained by cocondensing N,N-bis-(hydroxy-alkylated) benzimidazolones which are completely chlorinated and/or brominated in the phenyl nucleus, into polyesters based on terephthalic acid and ethylene glycol or 1,4-butanediol. Surprisingly, flame-resistant to flameproof modifications are achieved with relatively low proportions of the diol, and at the same time the ability of filaments spun from the polyester melt to crystallise during the subsequent stretching process is sufficiently high for the manufacture of fibres with good mechanical properties.

Accordingly, the present invention relates to the use of linear, thermoplastic polyesters which contain at least 50 mol % of condensed terephthalic acid and at least 50 mol % of condensed ethylene glycol or 1,4-butanediol, which have a relative viscosity of 1.1 to 2.0 measured at 30°C on a 1 % strength solution in equal parts of phenol and tetrachloroethane, and which also contain 2 to 30, especially 5 to 30 mol %, incorporated by condensation, of a diol of the formula I

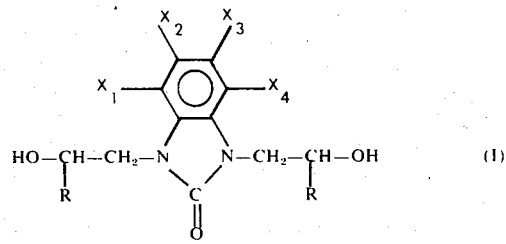

wherein R represents a hydrogen atom or the methyl, ethyl or phenyl group and $X_1$, $X_2$, $X_3$ and $X_4$ independently of one another denote a chlorine atom or bromine atom, for the manufacture of flame-resistant fibres.

Preferably, the relative viscosity is 1.3 to 2.0, preferably, in the formula I, R denotes a hydrogen atom and $X_1$, $X_2$, $X_3$ and $X_4$ represent either chlorine atoms or bromine atoms, and preferably 3 to 25, especially 3 to 20 mol % of the diol of the formula I are incorporated by condensation.

Further preferences are polyesters which contain at least 80 mol % of terephthalic acid and polyesters in which, in the formula I, $X_1$ and $X_4$, and $X_2$ and $X_3$, denote identical radicals.

In addition to terephthalic acid, the polyesters preferably contain up to 20 mol % of radicals of isophthalic acid, 2,5-dibromoterephthalic acid and/or 2,5-dichloroterephthalic acid, and in addition to ethylene glycol or 1,4-butanediol the polyesters preferably contain up to 20 mol % of radicals of aliphatic diols with 3 to 10 carbon atoms and/or 1,4-dihydroxymethylcyclohexane.

Polyesters which are preferred in particular are those which only contain terephthalic acid and ethylene glycol or 1,4-butanediol and a diol of the formula I incorporated by condensation, and polyesters wherein, in the formula I, R represents a hydrogen atom and $X_1$, $X_2$, $X_3$ and $X_4$ represent a bromine atom and/or a chlorine atom, especially a bromine atom.

The polyesters to be used according to the invention for the manufacture of fibres are obtained according to known processes, by polycondensing, in a known manner, terephthalic acid, optionally together with up to 20 mol % of other dicarboxylic acids, or their polyester-forming derivatives, with 5 to 30 mol % of the diol of the formula I and 70 to 95 mol % of ehtylene glycol or 1,4-butanediol, optionally together with up to 20 mol % of an aliphatic diol with 3 to 10 carbon atoms or a cycloaliphatic diol, in the presence of catalysts, to a relative viscosity of 1.10 to 2.0.

The following may be mentioned as suitable dicarboxylic acids which can be used additionally to terephthalic acid: 2,6-naphthalenedicarboxylic acid, 4,4'-, 4,3'- and 3,3'-diphenyldicarboxylic acid, 4,4'-, 4,3'- and 3,3'-diphenylsulphonedicarboxylic acid, alkyl-substituted terephthalic acids or isophthalic acids, such as 2,5-dimethylterephthalic acid, 2,5-diethylterephthalic acid, 2,5-dioctylterephthalic acid or 2,6-dimethyl-terephthalic acid. Isophthalic acid, and 2,5-dibromoterephthalic acid or 2,5-dichloroterephthalic acid are particularly suitable, since the flame-resistance can be improved further by using the halogenated aromatic dicarboxylic acids.

Examples of possible additional aliphatic diols with 3 to 10 carbon atoms are: 1,2- and 1,3-propanediol, 1,2- and 1,3-butanediol, 1,2-, 1,3-, 1,4-, 1,5-, 2,4- and 2,5-pentanediol, 1,6-hexanediol, 1,10-hexanediol, the various possible positional isomers not being listed for the higher-molecular diols. Examples of possible cycloaliphatic diols are 1,4-cyclohexanediol and especially 1,4-dihydroxymethylcyclohexane. These diols can be employed as cis-compounds and/or as trans-compounds.

The diols of the formula I are new compounds which can be manufactured as follows. First, the corresponding 1,3-bis-(hydroxyalkyl)-benzimidazolones are manufactured by addition reaction of 2 mols of alkylene oxide, such as ethylene oxide, propylene oxide, butylene oxide or styrene oxide with 1 mol of benzimidazolone in the presence of catalysts. These compounds, dissolved in a suitable solvent, are then completely halogenated in the aromatic nucleus by means of at least 4 mols, or an excess, of chlorine and/or bromine.

The halogenation can be carried out simultaneously with chlorine and bromine. Preferably, however, the halogenation is carried out either with chlorine or with bromine in order to obtain single substances. To manufacture defined benzimidazolone derivatives containing chlorine and bromine, the procedure followed is first to prepare the monohalogenated, dihalogenated or trihalogenated derivatives by reaction with one, two or three mols of bromine or chlorine or a slight excess thereof, and then to replace the remaining hydrogen atoms, in a second reaction stage, by chlorine or bromine. The crude tetrahalogen derivatives can contain up to approx. 10 % of trihalogen compound.

A further process for the manufacture of the diols is the addition reaction of 2 mols of an alkylene oxide, such as ethylene oxide, propylene oxide, butylene oxide or styrene oxide, with 1 mol of a completely halogenated benzimidazolone, for example tetrabromobenzimidazolone, in the presence of a catalyst.

Examples of possible diols of the formula I are: 1,3-bis-(2'-hydroxyethyl)-4,5,6,7-tetrabromo-benzimidazolone 1,3-bis-(2'-hydroxyethyl)-4,5,6,7-tetrachloro-benzimidazolone, 1,3-bis-(2'-hydroxy-n-propyl)-4,5,6,7-tetrabromo-benzimidazolone, 1,3-bis-(2'-hydroxy-n-butyl)-4,5,6,7-tetrabromo-benzimidazolone, 1,3-bis-(2'-hydroxy-2'-phenylethyl)-4,5,6,7-tetrabromo-benzimidazolone, 1,3-bis-(2'-hydroxy-2'-phenylethyl)-4,5,6,7-tetrachloro-benzimidazolone, 1,3-bis-(2'-hydroxy-n-propyl)-4,5,6,7-tetrachloro-benzimidazolone, 1,3-bis-(2'-hydroxyethyl)-5,6-dibromo-4,7-dichloro-benzimidazolone, 1,3-bis-(2'-hydroxy-n-butyl)-4,6,7-trichloro-5-bromo-benzimidazolone, 1,3-bis-(2'-hydroxyethyl)-4,6,7-tribromo-5-chloro-benzimidazolone and 1,3-bis-(2'-hydroxyethyl)-5,6-dichloro-4,7-dibromo-benzimidazolone.

The known processes for the manufacture of the new polyesters to be used according to the invention are, for example, solution condensation or azeotropic condensation, phase boundary condensation, melt condensation or solid phase condensation and combinations of these methods, depending on which polyester-forming derivatives and reaction catalysts are used.

The low molecular dialkyl esters with 1 to 4 carbon atoms in the molecule, preferably dimethyl esters or diphenyl esters, are used in the main as the polyester-forming derivatives of terephthalic acid and, where appropriate, of the other aromatic dicarboxylic acids. The acid halides, especially the acid dichlorides, are also suitable.

The new polyesters can be manufactured by esterifying or trans-esterifying terephthalic acid, optionally together with other aromatic dicarboxylic acids, or their low molecular dialkyl esters, with the diols of the formula I and ethylene glycol or 1,4-butanediol, optionally together with aliphatic diols ith 3 to 10 carbon atoms and/or cycloaliphatic diols, in an inert atmosphere, for example a nitrogen atmosphere, in the presence of catalysts at 150°– 250°C, with simultaneous removal of the resulting water or alkanol, and subsequently carrying out the polycondensation at 200° to 270°C under reduced pressure in the presence of certain catalysts until the polycondensates have the desired viscosity. Advantageously, the aliphatic or cycloaliphatic diol components are used in excess, so that after the esterification or transesterification reaction essentially monomeric diglycol esters of these diols and of the diols of the formula I are obtained, which are then polycondensed in vacuo in the presence of a polycondensation catalyst whilst distilling off the excess aliphatic or cycloaliphatic diols.

Esterification catalysts which can be used in the known manner are amines, inorganic or organic acids, for example hydrochloric acid or p-toluenesulphonic acid, or metals or metal compounds, which are also suitable for use as transesterification catalysts.

Since some catalysts preferentially accelerate the trans-esterification and others the polycondensation, it is advantageous to use a combination of several catalysts. Examples of suitable trans-esterification catalysts are the oxides, salts or organic compounds of the metals calcium, magnesium, zinc, cadmium, manganese, titanium and cobalt. The metals as such can also be used as catalysts. The polycondensation is catalysed, for example, by metals such as lead, titanium, germanium and especially antimony, and their compounds. These catalysts can be added to the reaction mixture conjointly or separately. The catalysts are employed in amounts of about 0.001 to 1.0 per cent by weight, based on the acid component.

In the manufacture of the new polyesters, it is particularly advantageous to use those catalysts which accelerate both the trans-esterification and the polycondensation. Above all, mixtures of different metals or metal compounds, and corresponding metal alloys, can be used as such catalysts.

The polycondensation reaction is carried out until the polyesters have a relative viscosity of 1.1 to 2.0, preferably 1.3 to 2.0. The reaction times are about 30 minutes to several hours, depending on the nature of the catalyst used and on the size of the batch. The polyester melt obtained is removed from the reaction vessel, cooled and then granulated, or converted to chips, in the usual manner.

Another process for the manufacture of the new polyesters is to polycondense terephthalic acid dihalides, and optionally acid halides of other aromatic dicarboxylic acids, preferably the acid dichlorides, with the diols of the formula I, ethylene glycol, or 1,4-butanediol, optionally mixed with the aliphatic or cycloaliphatic diols, in the presence of a basic catalyst in the temperature range from 0° to 100°C, with elimination of hydrogen halide. The basic catalysts used are preferably amines or quaternary ammonium salts. The proportion of the basic catalyst can be from 0.1 to 100 mol %, based on the acid halides. This process can also be carried out without solvents or in the presence of a solvent.

The polycondensation can also be carried out by first condensing the starting compounds in the melt until a certain viscosity is reached, then granulating the precondensate thus produced, for example by means of an underwater granulator, drying the granules and then subjecting them to a solid phase condensation, using vacuum and temperatures below the melting point of the granules. In this way it is possible to obtain higher viscosities of the polyesters to be used according to the invention, under gentler reaction conditions.

When working up the polyester melt, or even before the polycondensation reaction, inert adjuvants of all kinds can be added to the reaction mixture, such as, for example, inorganic or organic pigments, optical brighteners, delustering agents, agents which promote crystallisation or lubricants. Furthermore, the addition of compounds of the elements of the fifth main group, for example antimony trioxide, is preferred, because of the known synergistic action of these compounds. The addition of these compounds makes the products more flame-resistant or flameproof, which has the advantage that a smaller amount of the flame-resistant component can now be employed and nevertheless the same action is achieved as, for example, in the case of a polyester according to the invention which has a higher content of the flame-resistant component, corresponding to a higher total halogen content. The amount added of these compounds is so chosen that the mechanical properties of the fibres are not lowered excessively.

If the polycondensation is carried out discontinuously, the inert adjuvants can already be added during the last condensation stages, for example during the solid phase condensation or at the end of the melt condensation.

The polyesters to be used according to the invention can be partially crystalline to amorphous, depending on which diols and which dicarboxylic acids are used as starting components, and in what ratios they are employed. The polyesters are colourless to light brown in colour and are thermoplastic materials from which flame-resistant to flameproof fibres with good mechanical properties, and displaying a crystal orientation typical of stretched fibres, can be manufactured by melt spinning and subsequent stretching, using the devices customary for these purposes.

The flame-resistance of the fibres depends on the halogen used. It is generally known that compounds containing bromine exert a better flame-resistant action than compounds containing chlorine. N,N-bis-(hydroxyalkyl)-benzimidazolones completely brominated in the phenyl nucleus are therefore preferred. Furthermore, the flame-resistance of the fibres depends on the total halogen content and hence on the molar proportion of the diols, to be used according to the invention, in the polyester. If the content is greater than 15 mol %, the fibres are non-inflammable or self-extinguishing and at a lower content the fibres are of low inflammability. To improve the flame-resistance of polyesters which have lower content of halogenated benzimidazolone derivatives, small amounts of a compound which contains an element of the fifth main group can be added to the polyesters before the manufacture of the fibres.

The new fibres manufactured in accordance with known processes can be used to produce fabrics of all kinds.

The polyesters manufactured according to the examples which follow are characterised in more detail by the data mentioned below. The polyesters are characterised by the morphological changes which are measured by means of differential thermo-analysis on a sample which has been heated for 3 minutes at 30°C above the melting point or softening point and then been chilled rapidly. The chilled sample is heated by means of the "DSC-1B" differential scanning calorimeter of Messrs. Perkin-Elmer, using a speed of heating of 16°C/minute. The thermogram of the sample (compare the schematic representation in FIG. 1) shows the glass transition temperature ($T_g$), the crystallisation temperature ($T_c$) and the melting point ($T_m$). The glass transition temperature is taken to be the point of inflexion at the abrupt increase in specific heat in the thermogram, the crystallisation temperature is taken as the apex of the exothermic peak, the melting point is taken as the apex of the endothermic peak and the decomposition temperature ($T_d$) is taken at the point at which the abrupt exothermic and endothermic fluctuations in specific heat begin. The relative viscosity of the polycondensates of the examples is determined on solutions of 1 g of polyester in 100 ml of a mixture consisting of equal parts of phenol and tetrachloroethane, at 30°C. The softening point is determined on a Kofler heated stage microscope using a speed of heating of 15°C/minute, a cross being formed from two filaments and the softening point being taken as the temperature at which the sharp angles of the cross disappear. The percentage content of the elements in the polyester is determined by elementary analysis. The inflammability is determined by holding filaments of the polyester, drawn from the melt, in the flame of a Bunsen burner, then removing them and examining whether the polyester only melts, or burns, or burns and again becomes extinguished.

MANUFACTURE OF THE STARTING PRODUCTS

Example A— Manufacture of 1,3-bis-(2'-hydroxyethyl)-4,5,6,7-tetrabromobenzimidazolone (diol A)

333.3 g of 1,3-di-(2-hydroxyethyl)-benzimidazolone (1.5 mols) and 3.5 l of water are stirred at 90°C until a clear solution is obtained. 1,198 g of bromine (7.5 mols) are then added dropwise over the course of 30 minutes whilst stirring. Thereupon, a yellowish precipitate immediately separates out. After the dropwise addition, the mixture is stirred for a further 4 – 5 hours, and the internal temperature is raised to 92°– 96°C. The hydrogen bromide produced in the reaction, and the excess bromine vapours, are bound by means of 5

% strength sodium hydroxide solution in a trickle tower filled with active charcoal.

The mixture is then cooled to 5°– 10°C and the product is isolated by suction filtration. It is purified by stirring it with 5 l of water and again filtering off. The product is then dried in a vacuum cabinet at 100°C.

778.5 g (corresponding to 96.6 % of theory) of a practically colourless product melting at 266.2°C (Mettler FP 51 heated stage microscope, heating speed 1°C/min.) are obtained.

For purification, 100 g of the product are recrystallised from 300 ml of dimethylformamide/isopropanol = 3 : 1. After drying at 150°C, 75.4 g of pure white needles of melting point 267.4°C are obtained. For the subsequent polycondensations, this product is again purified further by recrystallisation for ethylene glycol.

The examination of the compound by NMR and mass spectrometry is in accord with the structure of 1,3-bis-(2'-hydroxyethyl)-4,5,6,7-tetrabromobenzimidazolone.

The elementary analysis gives the following results (for $C_{11}H_{10}Br_4N_2O_3$)

| Element | found | calculated |
|---|---|---|
| Carbon | 24.76 % | 24.57 % |
| Hydrogen | 1.92 % | 1.87 % |
| Nitrogen | 5.21 % | 5.21 % |
| Bromine | 59.45 % | 59.43 % |

Example B— Manufacture of 1,3-bis-(2-hydroxyethyl)-4,5,6,7--tetrahchlorobenzimidazolone (diol B).

222.2 g of the starting material used in Example A are dissolved in 2 l of water at 90°C. 425.4 g of chlorine gas (13.4 l) are passed into this solution for 6 hours at 90°–100°C. The chlorine stream is measured by means of a Rotameter flow meter. A device for equalising the pressure is interposed between the chlorine cylinder and the Rotameter. The hydrogen chloride liberated is bound by means of 10 % strength sodium hydroxide solution in a trickle tower filled with active charcoal. The mixture is worked up as in Example A.

333.5 g (92.6 % of theory) of crude product are obtained in the form of colourless crystals melting at 237.8°C. For further purification, these are recrystallised from a mixture of dioxane and ethylene glycol (ratio 1:1). The colourless crystal needles thus obtained melt at 240.1°C.

The NMR spectrum of the substance agrees with the structure of 1,3-bis-(2-hydroxyethyl)-4,5,6,7-tetrachlorobenzimidazolone. The elementary analysis gives the following results (empirical formula $C_{11}H_{10}Cl_4N_2O_3$)

| Element | found | calculated |
|---|---|---|
| Carbon | 36.65 % | 36.69 % |
| Hydrogen | 2.76 % | 2.76 % |
| Nitrogen | 7.99 % | 7.78 % |
| Chlorine | 39.20 % | 39.39 % |

Example C—1,3-Di-(2-hydroxyethyl)-4,7-dichloro-5,6-dibromobenzimidazolone a. Manufacture of 1,3-di-(2-hydroxyethyl)-5,6-dibromobenzimidazolone 333.3 g (1.5 mols) of 1,3-di-(2-hydroxyethyl)-benzimidazolone in 3,700 ml of water are warmed to 95°C whilst stirring. 511.4 g (3.2 mols) of bromine are added dropwise to this clear solution over the course of 70 minutes, during which a yellowish precipitate gradually separates out. After the dropwise addition, the reaction solution is stirred for a further 5 hours at 90°C, cooled to 10°C and filtered, and the precipitate is washed with a large amount of water, until free from acid. It is then dried to constant weight at 100°C/20 mm Hg.

537.7 g (94.3 % of the theoretical yield) of colourless crystals melting at 189°C are obtained. They can be purified further by recrystallisation from a dioxane/ethylene glycol mixture (1:3). The colourless crystals melt at 195.7°C (Mettler "FP 51"; heating speed 1°C/minute).

The elementary analysis gives the following results for $C_{11}H_{12}N_2Br_2O_3$ (molecular weight = 380.036)

| Found | Calculated |
|---|---|
| 34.70 % C | 34.76 % C |
| 3.10 % H | 3.18 % H |
| 7.40 % N | 7.37 % N |
| 42.00 % Br | 42.05 % Br |

According to a thin layer chromatogram (developing medium cyclohexane:ethyl acetate:acetic acid = 30:50:20) the crystals consist of a single substance.

b. Chlorination of (a)

25 g (0.06578 mol) of the dibromo compound manufactured according to (a) are dissolved in 5 liters of water at 95°C. 6 liters of chlorine gas (0.263 mol) are introduced over the course of about 90 minutes whilst stirring, during which a colourless precipitate separates out. The reaction solution is then stirred for a further 4 hours at 90°C, cooled to 10°C and filtered, and the precipitate is washed until free from acid. After drying, 24.1 g (81.4 % of the theoretical yield) of colourless crystals melting at 271.7°C are obtained (Mettler "FP 51"; heating speed 1°C/minute). The melting point of a sample recrystallised from dioxane/ethylene glycol is about 276° – 278°C.

The elementary analysis gives the following results for the crude product ($C_{11}H_{10}Cl_2Br_2N_2O_3$) (molecular weight = 448.9):

| Found | Calculated |
|---|---|
| 29.7 % C | 29.43 % C |
| 2.2 % H | 2.24 % H |
| 6.3 % N | 6.24 % N |
| 15.8 % Cl | 15.79 % Cl |
| 35.5 % Br | 35.59 % Br |

On the basis of the above elementary analysis results, and according to the NMR spectra, the new diol has the structure of a 1,3-di-(2-hydroxyethyl)-5,6-dibromo-4,7-dichlorobenzimidazolone.

MANUFACTURE OF THE POLYESTERS

Example 1

The following substances are introduced initially into a glass reactor fitted with a descending condenser, thermometer, nitrogen inlet and stirrer: 582 g of dimethyl terephthalate (DMT) (3.0 mols), 322.6 g of the diol A (0.6 mol), 594.8 g of 1,4-butanediol (6.6 mols) and 0.5 g of tetraisopropyl orthotitanate. This mixture is warmed to 150°C under a nitrogen atmosphere and the stirrer is then switched on. A clear colourless solution is produced and methanol begins to distil off. The temperature is raised to 205°C over the course of 2 hours, in the course of which the bulk of the methanol formed in the reaction distils off. The nitrogen inlet tube is then replaced by a nitrogen capillary and a water pump vacuum is applied. The temperature is raised from 105° to 250°C, and the pressure lowered from 760 to about 18 mm Hg, over the course of 2 hours. During this time, polycondensation occurs and 1,4-butanediol distils off. The water pump vacuum is then replaced by an oil pump vacuum and the condensation is continued for a further 2 hours, during which the temperature is raised to 270°C and the pressure is lowered to 0.7 - 1 mm Hg. The reaction mixture becomes progressively more viscous. Thereafter, nitrogen is passed in at 270°C, and after opening the reactor the polycondensate is poured into porcelain dishes to cool. Clear and transparent plates are thus obtained.

The polycondensate thus obtained shows the following characteristic data:

| | |
|---|---|
| Relative viscosity | 1.59 |
| Bromine content | |
|     found: | 20.50 % |
|     calculated: | 20.64 % |
| Glass transition range (DSC) | 68 – 78°C |
| Crystal transition range (DSC) | 130 – 150°C |
| Decomposition point $T_d$ (DSC) | 309°C |
| Softening point | 183°C |

Filaments drawn from the melt can be stretched. These stretched filaments show crystallite formation in polarised light, and are non-inflammable.

EXAMPLE 2

An apparatus according to Example 1 is charged with 582 g of dimethyl terephthalate (3.0 mols), 403.25 g of the diol A (0.75 mol), 594.8 g of 1,4-butanediol (6.6 mols) and 0.5 g of tetraisopropyl orthotitanate. This mixture is subjected to trans-esterification and polycondensation analogously to Example 2 (sic). A transparent, pale yellowish - coloured polyester with the following properties is obtained:

| | |
|---|---|
| Relative viscosity | 1.49 |
| Glass transition range (DSC) | 73 – 85°C |
| Decomposition point $T_d$ (DSC) | 305°C |

Filaments formed from the melt can be cold-stretched. These stretched filaments again shown crystallite formation under a polarisation microscope, and are non-inflammable.

Example 3

The following substances are reacted in an apparatus according to Example 2: 582 g of dimethyl terephthalate (3.0 mols), 322.6 g of the diol A (0.6 mol), 490.6 g of ethylene glycol (7.9 mols), 0.2 g of calcium acetate, 0.2 g of zinc acetate and 0.7 g of antimony trioxide.

This mixture is warmed to 150°C under a nitrogen atmosphere, and is then stirred. The reaction is carried out in accordance with the following scheme: 4 hours/150°C–215°C, 760 mm Hg, $N_2$ atmosphere, 1 hour/215°C–250°C, 760 mm Hg–20 mm Hg, $N_2$ atmosphere, 1 hour/250°C–280°C, 20 mm Hg–0.7 mm Hg, $N_2$ atmosphere, ½ hour/280°C–290°C, 0.9 mm Hg, $N_2$ atmosphere. Nitrogen is then passed in and the hot, highly viscous polyester is removed from the reactor.

A clear and transparent, yellowish to light brown polycondensate is obtained, which shows the following characteristic data:

| | |
|---|---|
| Relative viscosity | 1.58 |
| Glass transition range (DSC) | 95 – 105°C |
| Decomposition temperature $T_d$ (DSC) | 357°C |

Filaments drawn from the melt initially show practically no orientation in the polarisation microscope, but after stretching at slightly above room temperature the characteristic pattern of crystallite formation is found. The filaments are non-inflammable.

Example 4

A mixture of 582 g of DMT (3.0 mols), 387.1 g of the diol A (0.72 mol), 490.6 g of ethylene glycol (7.9 mols), 0.25 g of calcium acetate, 0.15 g of zinc acetate and 0.65 g of antimony trioxide is heated under nitrogen, in an apparatus according to Example 1, from room temperature to 145°C, during which methanol begins to distil off. After 30 minutes, a clear melt is produced. The temperature is then raised to 210°C over the course of 3 hours.

Thereafter, the temperature is raised to 245°C over the course of 1 hour, during which the polycondensation commences, with butanediol being split off. The water pump vacuum is applied, followed by an oil pump vacuum 45 minutes later, and during this time the bulk of the ethylene glycol distils off. The temperature is raised from 245°C to 282°C, the vacuum lowered from 2.0 mm Hg to 0.9 mm Hg, over the course of a further 2 hours. After introducing nitrogen, the melt is poured out. 690 g of a polycondensate which is dark yellow to light brown, and clear and transparent, are obtained. This polyester displays the following properties:

| | |
|---|---|
| Relative viscosity | 1.53 |
| Glass transition range (DSC) | 109 – 121°C |
| Decomposition point | 352°C |
| Softening point (Kofler method) | 215°C |

A filament drawn from the melt shows no orientation under the polarisation microscope. However, after stretching, crystallite formation is again clearly detectable. The fibres are non-inflammable.

Example 5 — PET copolyester with 25 mol % of 1,3-di-(2-hydroxyethyl)-5,6-dibromo-4,7-dichlorobenzimidazolone 31.8 g of DMT (0.164 mol) are trans-esterified, and polycondensed, with 18.7 g of 1,3-di-(2-hydroxyethyl)-5,6-dibromo-4,7-dichlorobenzimidazolone (0.042 mol) prepared according to Example C and 22.4 g of ethylene glycol (0.361 mol), under the catalytic action of 0.04 g of manganese-(II) acetate and 0.04 g of zinc- (II) acetate and 0.1 g of antimony trioxide, the following reaction conditions being maintained: 3 hours/150° – 210°C/nitrogen atmosphere/normal pressure, 1 hour/210° – 270°C/N₂/760 – 15 mm Hg and 1 hour/270° – 290°C/N₂/15 mm Hg – 0.6 mm Hg.

An amorphous, clear and transparent, copolyester is obtained, which softens at 180°C and has a relative viscosity of 1.67.

| | |
|---|---|
| Glass transition range (DSC): | 89–103°C |
| Decomposition point (DSC): | 310°C |

The copolyester thus obtained is fibre-forming and the fibres can be stretched. The individual fibres become extinguished after ignition.

Example 6

Analogously to Example 3, a mixture of 24.25 g of DMT (0.125 mol), 24.25 g of dimethyl isophthalate (0.125 mol), 40.35 g of the diol A (0.075 mol), 34.14 g of ethylene glycol (0.55 mol), 0.05 g of zinc acetate, 0.02 g of calcium acetate and 0.07 g of antimony trioxide is condensed, and the product isolated, under the conditions indicated in the said example.

A glass-clear, light, slightly coloured, non-inflammable polyester which displays the following data is obtained:

| | |
|---|---|
| Softening point (Kofler): | 145°C |
| Relative viscosity: | 1.52 |
| Glass transition range (DSC): | 96–109°C |

The elementary analysis ($C_{127}H_{92}Br_{12}N_6O_{43}$) gives the following results:

| Element | found | calculated |
|---|---|---|
| Carbon | 45.4 % | 45.51 % |
| Hydrogen | 2.9 % | 2.77 % |
| Nitrogen | 2.7 % | 2.51 % |
| Bromine | 28.1 % | 28.63 % |

Filaments drawn from the polymer melt can be stretched and become extinguished after ignition.

Example 7

The following reactants are polycondensed analogously to Example 1: 48.50 g of DMT (0.25 mol), 44.99 g of 1,3-bis-(2'-hydroxyethyl)-4,5,6,7-tetrachlorobenzimidazolone (0.125 mol), 49.56 g of 1,4-butanediol (0.55 mol) and 0.04 g of tetraisopropyl orthotitanate.

A glass-clear, pale yellowish polyester is obtained, which in the form of filaments only burns with difficulty and displays the following data:

| | |
|---|---|
| Softening point (Kofler): | 165°C |
| Relative viscosity: | 1.64 |

The elementary analysis gives the following result ($C_{31}H_{24}Cl_4N_2O_9$):

| Element | found | calculated |
|---|---|---|
| Carbon | 52.37 % | 52.42 % |
| Hydrogen | 3.42 % | 3.41 % |
| Nitrogen | 4.02 % | 3.94 % |
| Chlorine | 19.81 % | 19.96 % |

The copolyester can be stretched.

Example 8 — Multi-component polyester from DMT, diol B, trimethylphenyl-indanecarboxylic acid dimethyl ester and ethylene glycol Analogously to the procedure described in Example 3, 49.5 g of DMT (0.256 mol) and 30.0 g of trimethylphenyl-indanecarboxylic acid dimethyl ester (0.085 mol) are condensed with 61.2 g of diol B (0.17 mol) and 63.3 g of ethylene glycol (1.02 mols) under the catalytic action of 0.085 g of zinc acetate, 0.085 g of calcium acetate and 0.17 g of antimony trioxide.

An amorphous, almost colourless copolyester is thus obtained, which has a relative viscosity of 1.5 and a softening point of 175°C.

A filament obtained from the polymer melt is self-extinguishing after burning for 1–2 seconds, and can be stretched.

Examples 9 to 12

The table which follows again lists the physical data of the polyester compositions manufactured according to Examples 1–4. In addition, as technological data, the melt flow indices were determined at 2 different temperatures in each case, and furthermore, in Examples 9 and 10, the weight average molecular weight determined by light scattering measurements is also listed.

| Properties | Material Example 9 [Product according to Example 4] | Example 10 [Product according to Example 3] | Example 11 [Product according to Example 1] | Example 12 [Product according to Example 2] | Polyethylene terephthalate (Diolen) |
|---|---|---|---|---|---|
| Composition (PET=polyethylene terephthalate) (PBT=polybutylene terephthalate) | PET copolyester with 24 mol % of diol A | PET copolyester with 20 mol % of diol A | PBT copolyester with 20 mol % of diol A | PBT copolyester with 25 mol % of diol A | PET |
| Softening point (Kofler) | 215°C | 210°C | 183°C | 190°C | approx. 260°C |
| Glass transition temperature $T_g$ (DSC) | 109–121°C | 95–105°C | 68–78°C | 73–85°C | approx. 75–80°C |
| Decomposition point $T_d$ (DSC/TGA) | 352°C | 357°C | 309°C | 305°C | — |
| Melt-flow-index | | | | | |
| Test temperature | 190°C  265°C | 196°C  265°C | 200°C  265°C | 200°C  265°C | 265°C |
| Test force | 5 kg  1 kg | 5 kg  1 kg | 1 kg  1 kg | 1 kg  1 kg | 1 kg |
| Nozzle (mm) | 2.095  1.18 | 2.095  1.118 | 1.18  1.18 | 1.18  1.18 | 1.18 |
| Index (g/10 min.) | 11.4  38.0 | 18  51.7 | 1.5  50.5 | 1.4  43.0 | 69 |
| Relative viscosity | | | | | |

| Properties | Material | Example 9 [Product according to Example 4] | Example 10 [Product according to Example 3] | Example 11 [Product according to Example 1] | Example 12 [Product according to Example 2] | Polyethylene terephthalate (Diolen) |
|---|---|---|---|---|---|---|
| (in phenol+tetrachloroethane), 1 % strength, at 30°C $\eta$ rel | | 1.53 | 1.58 | 1.59 | 1.49 | 1.81 |
| Molecular weight (light scattering) Mw | | 55,000 (broad distribution) | 22,000 (broad distribution) | — | — | — |

Examples 13 to 15 (Spinning experiments)

Spinning experiments are carried out on a pilot plant multifil spinning installation with the polyester spinning compositions manufactured according to Examples 2, 3 and 4, the apparatus settings being chosen in accordance with the characteristic data determined in Examples 12, 10 and 9.

The following results are obtained:

|  | Example 13 Polyester according to 2 | 14 3 | 15 4 |
|---|---|---|---|
| Relative viscosity | 1.49 | 1.58 | 1.53 |
| Spinnability | + | ++ | + |
| Ease of winding | + | ++ | − |

What we claim is:

1. An improved process for preparing flame-resistant polyester fibers by melt spinning wherein the improvement comprises
melt spinning a copolyester of relative viscosity 1.1–2.0 dl/g, measured at 30°C on a 1% strength solution in equal parts of phenol and tetrachloroethane, consisting essentially in the total condensed diacid component of at least 50 mol % terephthalic acid and from 0 to 50 mol % of isophthalic acid, 2,5-dibromoterephthalic acid or 2,5-dichloroterephthalic acid; and in the total condensed diol component of at least 50 mol % of ethylene glycol or 1,4-butanediol, from 2 to 30 mol % of a diol of formula I

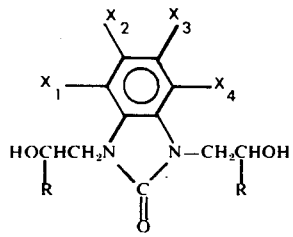

wherein R is hydrogen, methyl, ethyl or phenyl and $X_1$, $X_2$, $X_3$ and $X_4$ are independently of one another chlorine or bromine, and from 0 to 48 mol % of an aliphatic diol of 3 to 10 carbon atoms other than 1,4-butanediol; 1,4-cyclohexanediol or 1,4-cyclohexanedimethanol.

2. A process according to claim 1 wherein the relative viscosity is 1.3–2.0 dl/g.

3. A process according to claim 1 wherein R is hydrogen.

4. A process according to claim 1 wherein $X_1$, $X_2$, $X_3$ and $X_4$ are bromine.

5. A process according to claim 1 wherein of the total condensed diacid component at least 80 mol % is terephthalic acid; and of the total condensed diol component 0 to 20 mol % is an aliphatic diol of 3 to 10 carbon atoms other than 1,4-butanediol; or 1,4-cyclohexanedimethanol.

6. A process according to claim 1 wherein the total condensed diacid component is at least 80 mol % terephthalic acid.

7. A process according to claim 1 wherein the condensed diacid component is 100 mol % terephthalic acid; and total condensed diol component is 70 to 95 mol % ethylene glycol or 1,4-butanediol and 5 to 30 mol % diol of formula I.

8. A process according to claim 1 wherein from 3 to 25 mol % of the total diol component is a diol of formula I.

9. A process according to claim 8 wherein from 3 to 20 mol % of the total diol component is a diol of formula I.

10. A process according to claim 1 wherein R is hydrogen and $X_1$, $X_2$, $X_3$ and $X_4$ are bromine.

11. A process according to claim 1 wherein $X_1$, and $X_4$ are identical radicals.

12. A process according to claim 1 wherein $X_2$ and $X_3$ are identical radicals.

* * * * *